US010972773B2

(12) United States Patent
Dalela et al.

(10) Patent No.: US 10,972,773 B2
(45) Date of Patent: Apr. 6, 2021

(54) COORDINATING VIDEO DELIVERY WITH RADIO FREQUENCY CONDITIONS

(71) Applicant: Cisco Technology, Inc., San Jose, CA (US)

(72) Inventors: Ashish Dalela, Bangalore (IN);
Michael Hammer, Reston, VA (US);
Kevin Shatzkamer, Hingham, MA (US); Monique Morrow, Zurich (CH);
Peter Tomsu, Leitzersdorf (AT);
Vojislav Vucetic, Holmdel, NJ (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 15/715,053

(22) Filed: Sep. 25, 2017

(65) Prior Publication Data

US 2018/0014039 A1 Jan. 11, 2018

Related U.S. Application Data

(63) Continuation of application No. 13/418,495, filed on Mar. 13, 2012, now Pat. No. 9,774,894.

(51) Int. Cl.
*H04N 19/124* (2014.01)
*H04N 19/126* (2014.01)
(Continued)

(52) U.S. Cl.
CPC .......... *H04N 21/238* (2013.01); *H04L 65/80* (2013.01); *H04N 21/2343* (2013.01); *H04N 21/44209* (2013.01); *H04N 21/6379* (2013.01)

(58) Field of Classification Search
CPC .... H04B 7/0617; H04B 7/024; H04B 7/0413; H04B 7/18504; H04B 17/309;
(Continued)

(56) References Cited

U.S. PATENT DOCUMENTS 7,477,688 B1 * 1/2009 Zhang .................. H04N 19/159
375/240
7,609,162 B2 * 10/2009 Kim ..................... H04L 63/0492
340/572.1

(Continued)

*Primary Examiner* — Dave Czekaj
*Assistant Examiner* — Kehinde Abimbola
(74) *Attorney, Agent, or Firm* — Patterson + Sheridan, LLP

(57) ABSTRACT

System and methods for modifying streaming data based on radio frequency information is provided. As radio transceivers transition move to a shared resource or cloud model and the existing radio transceivers are split into a baseband unit and a remote radio head, radio frequency (RF) information including power levels, encoding, data rates, and bandwidth can be provided to video optimization server. The RF information can be provided more frequently to allow real-time modifications to streaming video data. Existing protocols are reactionary in nature and perceive changing channel conditions indirectly. By providing RF information from the baseband unit on a low latency channel, modifications to the video stream can be made before an impact would be noticed at the protocol level. Also, policy information can be used to influence the changes made to streaming data in addition to the RF information.

20 Claims, 6 Drawing Sheets

(51) Int. Cl.
*H04N 19/13* (2014.01)
*H04N 19/136* (2014.01)
*H04N 19/15* (2014.01)
*H04N 19/157* (2014.01)
*H04N 19/159* (2014.01)
*H04N 19/186* (2014.01)
*H04N 19/30* (2014.01)
*H04N 19/51* (2014.01)
*H04N 19/61* (2014.01)
*H04N 19/70* (2014.01)
*H04N 19/86* (2014.01)
*H04N 21/238* (2011.01)
*H04N 21/2343* (2011.01)
*H04N 21/442* (2011.01)
*H04N 21/6379* (2011.01)
*H04L 29/06* (2006.01)

(58) Field of Classification Search
CPC ........... H04B 10/25752; H04B 17/336; H04B 7/0452; H04B 7/0456; H04B 7/0689; H04B 7/10; H04B 10/2575; H04W 88/085; H04W 24/02; H04W 36/14; H04W 24/08; H04W 72/04; H04W 24/10; H04W 72/042; H04W 84/042; H04W 88/08; H04W 36/32; H04W 72/0413; H04W 72/0453; H04W 76/27; H04W 52/146; H04W 88/02; H04W 4/029; H04W 28/06; H04W 56/001; H04W 56/002; H04W 72/1289; H04W 52/247; H04W 52/46; H04W 72/0446
See application file for complete search history.

(56) References Cited

U.S. PATENT DOCUMENTS

| | | | | |
|---|---|---|---|---|
| 8,270,916 B2* | 9/2012 | Pennec | ............... | H04B 1/3822 330/127 |
| 8,279,098 B2* | 10/2012 | Saunders | ............... | H04N 19/13 341/143 |
| 8,682,392 B2 | 3/2014 | Gelbman et al. | | |
| 8,971,311 B2* | 3/2015 | Bianconi | ............... | H04L 65/605 370/235 |
| 9,160,778 B2 | 10/2015 | Albal et al. | | |
| 9,774,894 B2 | 9/2017 | Dalela et al. | | |
| 2005/0265321 A1* | 12/2005 | Rappaport | ............ | H04L 41/145 370/352 |
| 2006/0104262 A1 | 5/2006 | Kant et al. | | |
| 2006/0287915 A1* | 12/2006 | Boulet | ............... | G06Q 30/0269 705/14.61 |
| 2007/0019068 A1 | 1/2007 | Arseneau et al. | | |
| 2007/0019069 A1 | 1/2007 | Arseneau et al. | | |
| 2007/0022438 A1 | 1/2007 | Arseneau et al. | | |
| 2007/0022445 A1 | 1/2007 | Arseneau et al. | | |
| 2007/0022446 A1 | 1/2007 | Arseneau et al. | | |
| 2007/0022447 A1 | 1/2007 | Arseneau et al. | | |
| 2007/0058041 A1 | 3/2007 | Arseneau et al. | | |
| 2007/0080784 A1* | 4/2007 | Kim | ................... | H04L 63/0492 340/10.1 |
| 2008/0134165 A1 | 6/2008 | Anderson et al. | | |
| 2009/0097551 A1* | 4/2009 | Zhang | ................. | H04N 19/172 375/240.03 |
| 2010/0178886 A1* | 7/2010 | Pennec | ................ | H04B 1/3822 455/127.1 |
| 2010/0248643 A1* | 9/2010 | Aaron | .................. | H04L 1/0022 455/68 |
| 2011/0106969 A1 | 5/2011 | Choudhury et al. | | |
| 2011/0307928 A1* | 12/2011 | Saunders | ............... | H04N 19/13 725/62 |
| 2012/0076131 A1* | 3/2012 | Bianconi | ............... | H04L 65/605 370/352 |
| 2012/0084423 A1 | 4/2012 | McGleenon | | |
| 2012/0099512 A1* | 4/2012 | Yamazaki | ............ | H04W 52/40 370/312 |
| 2012/0133731 A1 | 5/2012 | Lin et al. | | |
| 2013/0077966 A1 | 3/2013 | Gelbman et al. | | |
| 2013/0111052 A1 | 5/2013 | Albal et al. | | |
| 2013/0114523 A1* | 5/2013 | Chatterjee | ............ | H04L 1/0077 370/329 |
| 2014/0036990 A1* | 2/2014 | Harrison | ............... | H04N 21/222 375/240.01 |
| 2015/0163277 A1 | 6/2015 | Albal et al. | | |

* cited by examiner

COORDINATING VIDEO DELIVERY WITH RADIO FREQUENCY CONDITIONS

CROSS-REFERENCE TO RELATED APPLICATIONS

This application is a continuation of U.S. patent application Ser. No. 13/418,495, filed Mar. 13, 2012 and entitled "COORDINATING VIDEO DELIVERY WITH RADIO FREQUENCY CONDITIONS", which is incorporated by reference in its entirety.

FIELD OF THE DISCLOSURE

This disclosure relates generally to mobile wireless networking, and specifically to a system and method for providing video delivery based on radio frequency conditions over a mobile wireless network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. These applications use media protocols to stream media such as video and audio from media servers to client programs running on mobile devices. Example media protocols include adaptive bitrate (ABR) streaming, real time streaming protocol (RTSP), and real-time transport protocol (RTP). These media protocols rely on video compression and coding techniques that reduce the data rate of video signals, allowing them to be sent over wireless links with constrained bandwidth characteristics.

DESCRIPTION OF EXAMPLE EMBODIMENTS

Overview

Figure 1:
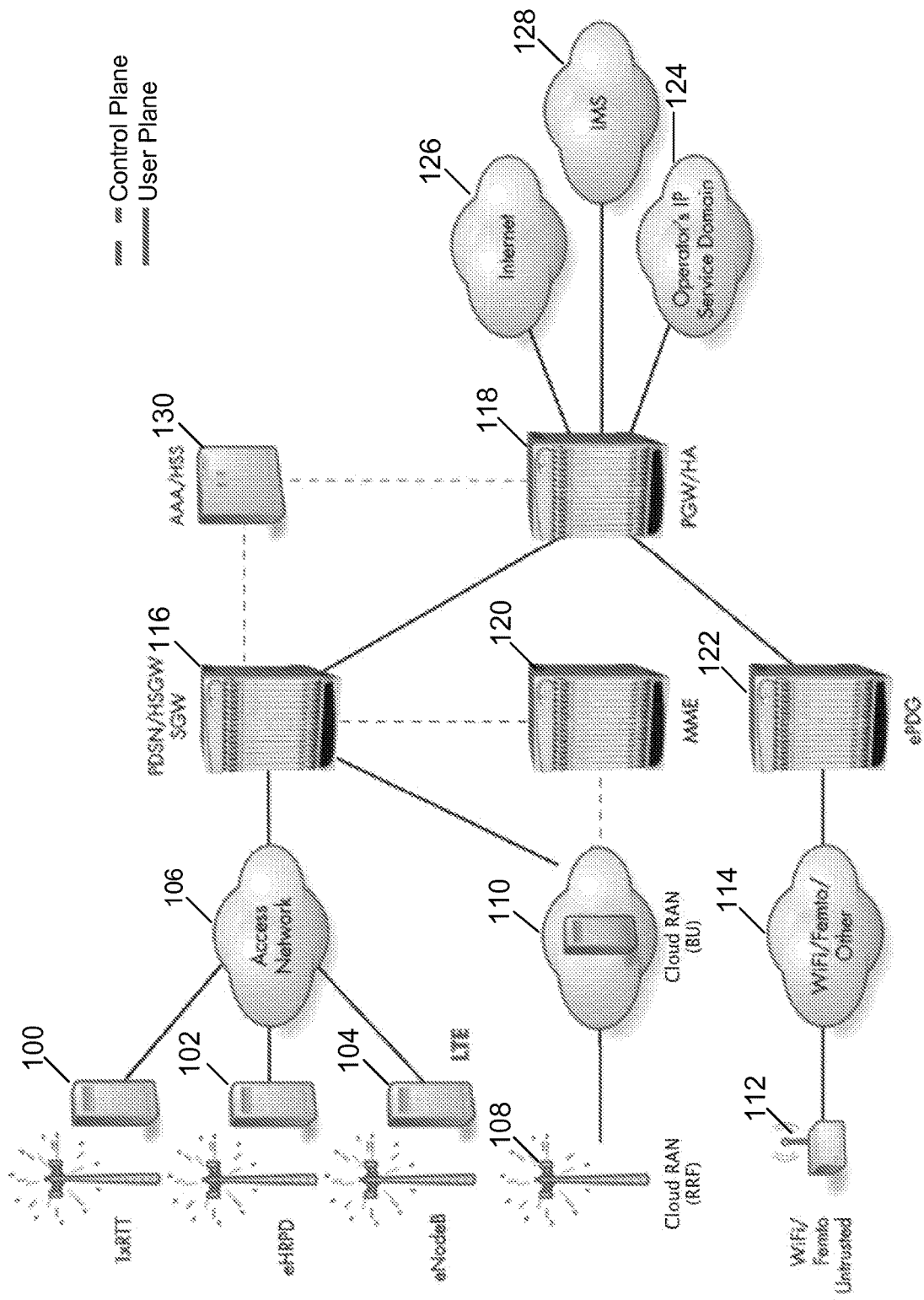
FIG. 1 illustrates a communication network including a long term evolution (LTE) topology for media delivery enhancement in accordance with some embodiments.

In some embodiments, a method is disclosed that comprises receiving streaming video data from a video server that is destined for a mobile node at a video optimization server managing video compression of the video data, receiving radio frequency (RF) information from a baseband unit that receives RF information from a remote radio head regarding the mobile node's wireless power level and encoding at the video server, modifying video compression of the streaming video data based on changes in the RF information at the video optimization server, wherein the video compression includes modifying a video codec rate to match an effective channel data rate, and transmitting modified streaming video data to the mobile node through the baseband unit and remote radio head.

EXAMPLE EMBODIMENTS

Internet applications and services rely on a set of specific delivery methods to communicate video and audio multimedia over a network. As one example of communications using delivery methods, a user visits a video streaming web site using a mobile device. When the user chooses a video to view, a client program running on the mobile device contacts a video server on the Internet to request a video stream. The video server may request the video stream from a content server, or may request the video stream from an intermediate server. The video server ultimately streams the requested video to the client program on the mobile device using media protocols. Media files are generally relatively large in size and are often not downloaded all at once. Accordingly, many web sites stream media, so that users will not have to wait for a lengthy download to complete. However, even with the decreased data throughput required by streaming, the bandwidth requirements of video often demand a significant portion of the capacity of today's networks. For this reason, a mobile network may rely on optimizing video traffic for delivery to the mobile device by adaptively increasing and decreasing the level of compression applied to the video traffic. This is done at a video compression server in the mobile network.

However, in order to benefit from optimization of a video compression server in the network, the compression server is located closer to source of the video and the video compression server operates independently of the mobile device's location or situation. Due to the video compression server's location in the network, it does not have access to information that could be used to provide a better user experience. Any modifications to a video stream through media protocols can come after the video stream has already been impacted. The impacts can include changes in adaptive coding if bit error rates increase, packets can be randomly dropped when data rates change, and retransmission of dropped packets can increase latency or cause jitter. The result of these types of impacts is poor video/voice quality streams of data. It can be difficult for the network to respond to these types of impacts due to the mechanisms available for detecting and communicating issues. For example, if a mobile device was running adaptive bitrate (ABR) protocol to receive video content the protocol, and a problem was detected, the video rate can be changed. However, this change occurs after a problem has arisen and the changes may be sub-optimal because the changes are occurring at the application layer, which may not be aware of lower level problems. As a result, the video compression server can at best receive only partial information after a problem has occurred.

In order to provide a better user experience and to allow enhanced performance in the network, in certain embodiments Radio Frequency (RF) information can be used to determine how data is communicated in the network. As mobile devices and cellular technologies evolve, the radio transceiver can change to where the processing and resources are concentrated at the edge of the network and the radio transceivers are much simpler. This can include a number of benefits such as reduced power requirements and more efficient resource management. For example, the base stations can be virtual base stations that share resources with other virtual base stations. This can reduce network operators capital and operating expenditures on the network, while providing better service for users. These benefits occur because the resources can be shared amongst many different radio transceivers and as such the total amount of resources used can be less. When the base station processing and memory are moved to the edge of the network and concentrated, RF information is also more readily available to the network.

In some embodiments, compression of the video signal is facilitated by providing detailed and current RF information about the physical layer connection between the mobile device and the base station. This can include RF power information communicated between the mobile device or user equipment (UE) and the based station to: (a) instruct the RF transceiver to increase or decrease RF transmission power, (b) change data rates of data transmitted, (c) step up or down traffic path encoding. The bandwidth between the mobile device and the base station is a function of the physical layer RF connection. By providing RF information including information regarding RF connection to the network including the video optimization server, the video optimization server is able to adjust to changes to the connection. This enable the video optimization server to provide video that is less compressed and of higher quality when the radio link bandwidth increases, and more compressed and of lower quality when the radio link bandwidth decreases. This correlates to whether a user is in a cell coverage area with strong signal or with weak signal. In certain embodiments, this RF information may be made available to gateways, intermediary nodes, and other base station subsystem elements in the network (e.g., policy charging and rules function (PCRF), Video Optimization, and others) in order to correspondingly adapt real-time traffic.

In certain embodiments, a video optimization server may perform video optimization functions and dynamically adapt optimization algorithms based on a UE's RF conditions. By synchronizing video optimization with RF conditions, a mobile video experience can be improved. For example, based on RF information logic in the video optimization server can intelligently downgrade the codec and reduce the data rate when RF information indicates conditions are changing. Without this coordination, packets can be delayed or dropped randomly in order to deal with changes in the RF connection. This allows the mobile carrier to play a role in content delivery, such as adjusting compression and other settings in the delivery of streaming media. The RF information combined with algorithms in the network can increase the perceived usefulness of the adaptive compression techniques implemented at the video compression server, as a user's perceived video quality will be improved during both times when the user is in an area with strong signal and times when the user is in an area with weak signal. Signal strength and data rate may thus be aligned using the RF information. The RF information can also allow the video compression server to be used selectively, which reduces unnecessary load on the video compression server.

If the RF power information is available to the video compression server, then the compression may be dynamically turned on/off for a given user session. When RF conditions are good, video compression may be turned off. When RF conditions are poor, and traffic encoding is using more redundancy, video compression may intelligently reduce the video codec rate to match the effective channel data rate. In this way, a variety of video compression techniques may be extended by this disclosure to include RF considerations. Details about RF conditions may also enable the video compression server to determine the magnitude of the codec rate change. As RF conditions vary rapidly and the UE is instructed to change its encoding and power, the application/services may also adapt intelligently to conform with the network reality.

Additionally, cloud radio access network (cloud RAN) solutions may enable RF channel information to be obtained from a cloud channel and used for voice and video optimization. A cloud RAN is a radio access network where certain base stations functions are decoupled from the RF antenna. For example, the MAC PHY and antenna array functions of the nodeB/eNodeB can be separated into a Baseband Unit (BU), while the conversion of digital signals into analog radio signals, power amplification, and radio signal transmission are separated into a Remote Radio Head (RRH). The remote radio head can be connected to the baseband unit with a fiber-optic or high-bandwidth physical link, which allows the baseband unit to serve multiple remote radio heads. The baseband unit serves as the cloud baseband unit allowing for resources to be shared amongst multiple remote radio heads or RF transceivers. RF information including UE power information is received at the baseband unit at regular intervals and can be communicated to other network devices such as the gateways and video servers. In some embodiments, the low latency between a baseband unit and the video compression server enables rapid adaptation of video compression settings on the basis of changing RF conditions.

In some embodiments, RF information may include signal fading reports and/or handoff reports. In mobile networks, a user equipment (UE) may send out reports periodically, which are used for handoffs. Signal fading reports may also be sent by user equipment every millisecond. UMTS and CDMA also provide closed-loop power control, which involves rapid signaling between the UE and the base station. These signals provide radio link layer information that can be used to enhance media delivery. When the signaling is low-latency, it allows video compression to be optimized multiple times a second. Additional signals may be used in certain embodiments.

FIG. 1 illustrates a communication network that includes a media delivery enhancement mechanism in accordance with certain embodiments. FIG. 1 includes a number of radio access technologies such as a 1×RTT transceiver 100, an evolved high-rate packet data (eHRPD) transceiver 102, and an evolved Node B (eNodeB) transceiver 108, each of which can connect to an access network 106. eNodeB 108 is an LTE network radio network component that connects to an Evolved UMTS Terrestrial Radio Access Network (E-UTRAN). Other radio access technologies such as WiFi, Femto, WiMAX, or any other radio spectrum technology can use transceiver 112 to connect to the network using a broadband or other access network. Also network technologies based on CDMA, such as CDMA-2000, high rate packet data (HRPD), and others can be used.

The radio access network may also be implemented by a Cloud RAN (C-RAN) 108/110, which is a RAN that separates the baseband unit from the RF interface. The baseband unit processing can be performed on a network server or other network device connected via fiber or a similar low-latency, high-performance connection to the RF transceiver. The RAN radio interface is called the Remote Radio Head (RRH). Remote radio head 108 and baseband unit 110 are shown in FIG. 1. A Service Orchestration Protocol (SOP) may be used to signal changing RF conditions on a per user basis to a cloud controller. The cloud controller determines or allocates server resources where a particular user's video optimization takes place and forwards a orchestration command to start/stop/modify the optimization operation. The cloud orchestrator creates a linkage between a cloud-based RAN and a cloud base station subsystem.

The access network 106 can communicate with an access gateway 116 that implements a combination of functionalities such as a packet data serving node (PDSN), a HRPD serving gateway (HSGW), and a serving gateway (SGW). Access gateway 116 may also incorporate a cloud RAN baseband unit. Access gateway 116 may also be the location of the video compression server, in some embodiments of the invention.

The access gateway 116 can communicate with an anchor gateway 118, which can implement a packet data network gateway (PGW) and a Home Agent (HA) and a mobility management entity (MME) 120. On the access network side, the anchor gateway 118 can also communicate with an evolved packet data gateway (ePDG) 122 which provides connectivity to the WiFi/Femto/other transceiver 112. On the packet core side, the anchor gateway can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both to supply policies relating to billing, desired data rate policies, desired video compression policies, and/or other policies, as further described below.

The Home Subscriber Server (HSS) 130 can be a master user database that supports various IMS network entities that handle calls. The HSS 130 stores subscription-related information (subscriber profiles), performs authentication and authorization of the user, and can provide information about the subscriber's location and IP information. The AAA server 130 can provide authentication, access control, and accounting to the network. The authentication can involve verification of the mobile subscriber, the access control can involve granting or denying access to specific services, and the accounting that can take place is the tracking of the use of network resources by mobile subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120.

The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1× and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

In some embodiments, the video compression server can be implemented on a gateway, such as access gateway/PDSN/HSGW/SGW 116. The gateway 116 can access and maintain mobile system information relating to the mobile communication session, the mobile subscriber, the radio bearers, and the subscriber policies relating to the mobile communication session. The gateway 116 may be used to provide various services to a mobile device and implement quality of service (QoS) on packet flows. The communication networks also allow provisioning of applications such as streaming video, streaming music, and other content delivered to a mobile node. Residing within the gateway can be one or more network processing units, line cards, as well as packet and voice processing cards. The below use cases can be implemented on various different combinations of gateways.

In some embodiments, multimedia data is adapted according to radio link layer/PHY conditions before being sent to the user equipment over access network 106. Access gateway 116 may contain a video optimization server that can be used to adapt the multimedia stream. The access gateway 116 is connected to a policy server, such as AAA server 130, which may provide subscriber information such maximum data rate of a video stream or for the user's other data connections and the pricing model of the subscriber. RF information may be communicated over access network 106 to access gateway and/or video compression server 116 using an out of band protocol.

Radio link layer information may be integrated into a policy model at AAA server 130, and access network 106 and access gateway 116 transmit RF information to AAA server 130, in order to facilitate delivery of content. In some embodiments, access gateway 116 and/or the video compression server on access gateway 116 may act independently on RF information, or may act based on policies and instructions received from AAA server 130. In other embodiments, a video compression server may be implemented as a separate device or server, such as a separate unified computing server (UCS).

In some embodiments, access network 106 may be separated into a cloud RAN base unit (BU) 110 and remote radio head (RRH) 108. The BU may be co-located on the same device as access gateway and video compression server 116. In order to communicate radio link layer/PHY conditions, the unified device may use low-latency communications between the BU and video compression server 116.

Video compression server 116 may operate by having a default mode and one or more reduced-bandwidth modes, in some embodiments. In the default mode, video could be transmitted to a user device using the original video compression parameters of the video. This mode is suitable for situations when the bandwidth of the radio link exceeds the bandwidth requirements of the video. In the reduced-bandwidth mode, the video compression server may compress, recompress, or transcode video frames or other aspects of the video signal to reduce the bandwidth requirements of the video. A desired data rate may be achieved by applying a reduced bandwidth-mode of a specified level of compression, or by rapidly switching between the reduced-bandwidth mode and the default mode to achieve a desired average data rate. When the reduced-bandwidth mode is used using rapid switching, and radio link information is incorporated into the video compression server compression algorithm, the rapid switching may be enabled by a low-latency connection between the video compression server and the access network.

Figure 1A:
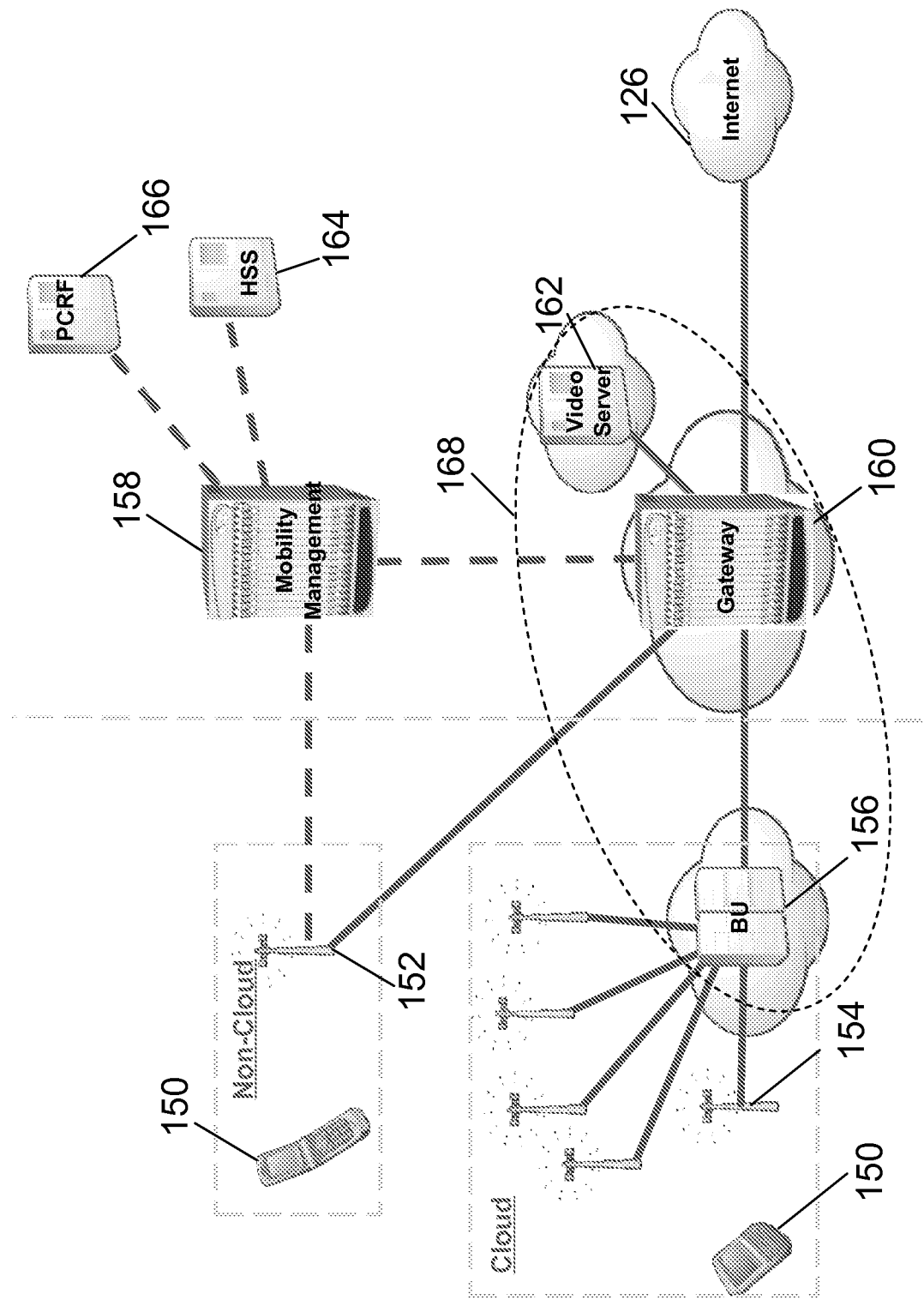
FIG. 1A illustrates a communication network with cloud-based components in accordance with some embodiments.

FIG. 1A illustrates a cloud based architecture in a communication network in accordance with certain embodiments. FIG. 1A includes user equipment 150, Non-cloud radio transceiver 152, remote radio head 154, baseband unit 156, mobility management entity 158, gateway 160, video server 162, HSS 164, PCRF 166, orchestration layer 168, and Internet 126. As shown, the cloud radio access network (RAN) can be separated into multiple radio transceivers 154 and combined baseband unit 156 that services the multiple radio transceivers 154. The baseband unit 156 resources can be virtually partitioned into configurable baseband units that are allocated to each radio transceiver and in some embodiments can be tracked on a per subscriber basis. Due to the configurable nature and servicing of multiple remote radio heads 154, the baseband unit 156 provides a cloud based RAN.

Gateway 160 can also be implemented to provide multiple logical gateway elements with the resources in a chassis being configurable to the needs of any one logical gateway element. In some embodiments, video optimizations can be performed on gateway 160. Video server 162 provides video optimization outside of gateway 160. When user equipment 150 requests multimedia content such as a video from a content server in Internet 126, gateway 160 can provide a connection from the user equipment to the content server. Gateway 160 can also send the streaming data to the video optimization server 162 for processing. The video optimization server 162 sends the processed streaming data back to gateway 160 to send to user equipment 150. Because the baseband unit 156, gateway 160, and video optimization server 162 are located in an orchestration layer 168 in some embodiments, RF information can be provided gateway 160 and video optimization server 162 to adapt the streaming data to the radio link conditions between the remote radio head and the user equipment. In some embodiments, data stream processing can be co-located with the baseband unit. This can allow nearly real-time adaptations to streams based on RF information in the RAN cloud.

With the baseband unit 156 located on the core network side of the backhaul link, and closer to the gateway 160 and video optimization server 162, these network devices can be implemented as shared resource devices in the network. When implemented as shared resource devices, a controller is used to manage virtual implementations of these network devices. For example, in the baseband unit, separate virtual baseband units can be used for each RF transceiver. However, each of these separate virtual baseband units includes a configurable amount of resources in the shared baseband unit. Because the baseband is carved into configurable virtual baseband units, the resources can be used more efficiently across multiple remote radio heads. This architecture also permits other network devices to deployed in a similar fashion where one physical device is partitioned into multiple virtual devices for management purposes.

If multiple network devices are each implemented in such a fashion in the network, then a service orchestration protocol (SOP) can be used to coordinate and communicate between the virtual instances of the different devices and between the network device resource blocks. In some embodiments, the network device resource blocks are co-located or connected with low latency links. The connectivity allows for more information to be shared among the devices in the network and at speeds that permit adaptations to occur as changes impact the ability to deliver data to a user equipment. It can also allow policy information to be used in ways that were not possible before by allowing policy servers to understand what resources can be devoted to enforcing policies and what policies cannot be supported. For example, many times policy information dictates quality of service (QoS) for a particular data stream or subscriber, but the resources are not available to support the requested QoS level so the QoS level is not provided. The service orchestration layer can allow for greater communication between the policy server and the network as well as allow policy information to dictate how various situations are handled as they are detected. For example, with the cloud-based baseband unit, radio link conditions can be fed back to other devices in the network to adapt data according to the condition information as well as the policy information.

The RF information including radio link conditions can be communicated to other devices in the network using an out-of-band channel. An out-of-band channel can be distinguished from an in-band channel that is typically used to deliver the data or content. In the case of 3GPP and other mobile networks, in-band channels may include the data plane of the mobile network. An out-of-band channel includes a channel that is not used to deliver content. Instead, it may provide a communications channel between network devices that may provide control capability. In the case of 3GPP and other mobile networks, such channels may include the control plane of the mobile network. The 3GPP model separates data and control planes by using different interfaces for different types of traffic. In this application, separation by interface is possible, but is not required. A variety of protocols for out-of-band channels may be used, such as eXtensible Messaging and Presence Protocol (XMPP), DOCSIS, Diameter, RTCP, and eXtensible Markup Language (XML). In some embodiments, the service orchestration protocol is provided in an out-of-band channel.

Content may be served via an in-band channel from a streaming server or media server using a standard protocol, such as hypertext transfer protocol (HTTP), session initiation protocol (SIP), or RTSP. Content may also be served using an adaptive bitrate (ABR) protocol. An adaptive bitrate protocol provides different bit rates for content based on the available network bandwidth upon request. For example, a single video object may be provided at 128 kbps, 256 kbps, 512 kbps, 1 Mbps, and other bit rates. Adaptation can occur via signaling performed between a mobile node and the content server. When a mobile node makes a request for a content object, such as a television program or feature-length movie, the content server may respond with a list of chunks of the requested content, known as an index file, along with a list of each bit rate supported by a given chunk. There may also be a universal resource locator (URL) associated with each chunk/bitrate combination. The mobile node may then respond by selecting a chunk and a bitrate to identify the specific media file to be downloaded at that time. The mobile node may select a chunk by requesting the chunk directly from the URL contained in the Index file. The video server, in this instance, may be stateless.

Figure 2:
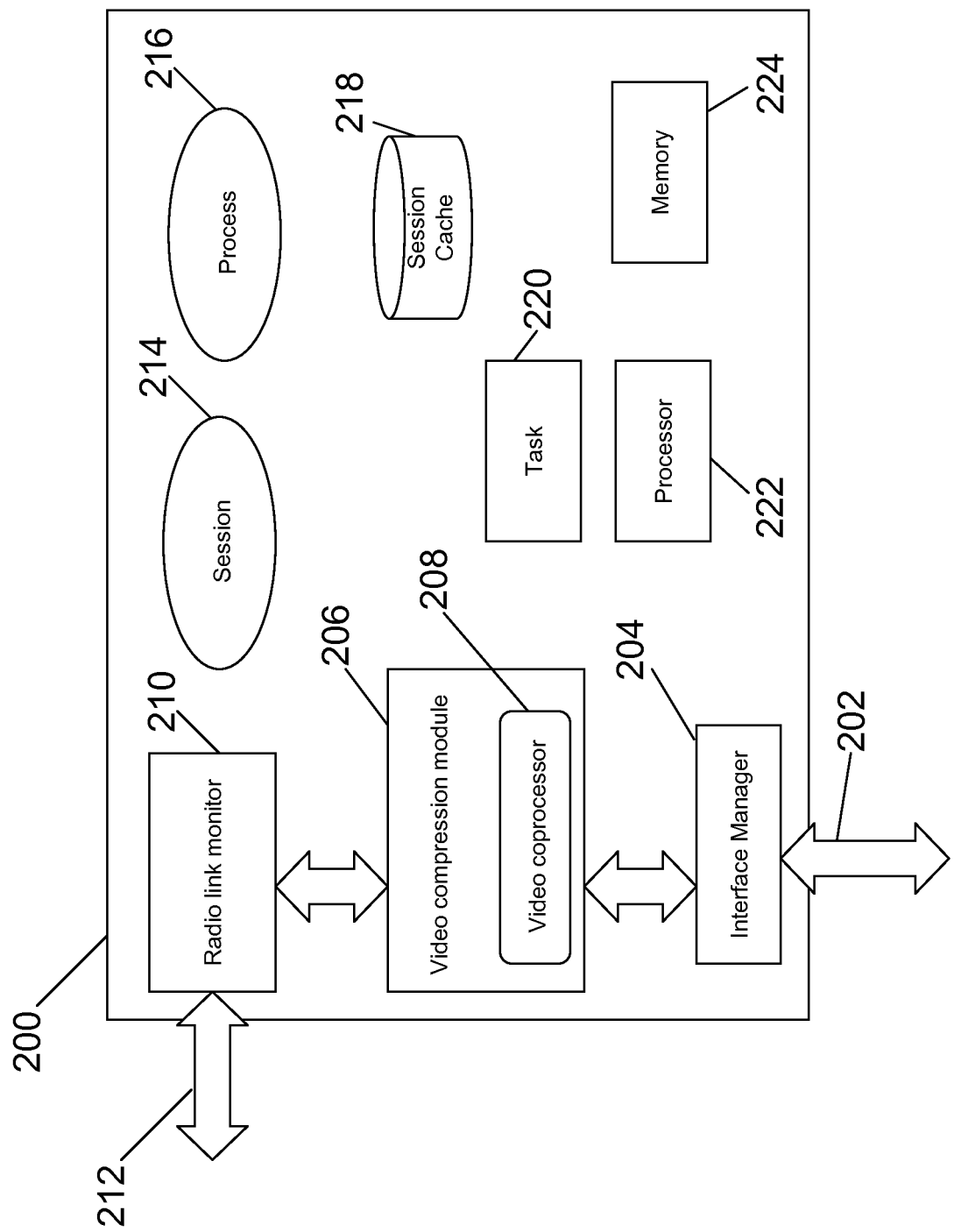
FIG. 2 illustrates a logical view of a network device for media delivery enhancement in accordance with some embodiments.

FIG. 2 illustrates a logical view of a network device that implements media delivery enhancement in accordance with certain embodiments. In FIG. 2, network device 200 includes a data interface 202, an interface manager 204, a video compression module 206, a video coprocessor 208, a radio link monitor 210, a radio link interface 212, a session 214, a process 216, a session cache 218, tasks 220, a processor 222, and memory 224. The network device may be a gateway in the control plane of a mobile network, a gateway in the data plane of a mobile network, or both.

Data interface 202 may be used to transmit video data to a mobile device from an upstream video server (not shown). Video compression module 206 is in communication with the upstream video server, and performs compression and/or optimization of video prior to sending video to the mobile device. Certain functions may be performed by a video coprocessor 208 included in the video compression module. Video compression module 206 is in communication with radio link monitor 210. The link between video compression module 206 and radio link monitor 210 may be a low-latency link. Radio link monitor 210 is in communication with a radio access network (not shown) via radio link interface 212. The radio link interface can be an out-of-band signaling channel in some embodiments. In other embodiments, data interface 202 can include RF information from the radio access network. Processor 222 can be one or more integrated circuits that are a multipurpose, programmable, clock-driven, register-based electronic device that accepts binary data as input, processes it according to instructions stored in its memory, and provides results as output. In some embodiments, processor 222 can be constructed for a specific purpose to perform media delivery enhancement or another specific task.

Memory 224 can be any type of computer readable medium such as random access memory (RAM), programmable read-only memory (PROM), a field programmable gate array (FPGA), flash memory, optical disk drive, or magnetic storage medium. The memory 224 can be used to store computer programs or logic that can be run on processor 222. The memory 224 can also store information such as data structures and other data that is used for providing media delivery and for providing mobile system information relevant to media delivery enhancement such as Quality of Service, wireless performance information, mobile performance information, end-to-end system performance information, subscriber behavior, subscriber profile, policy control, identity databases, and location systems. The memory 224 may also store radio link information from radio link monitor 210.

Figure 3:
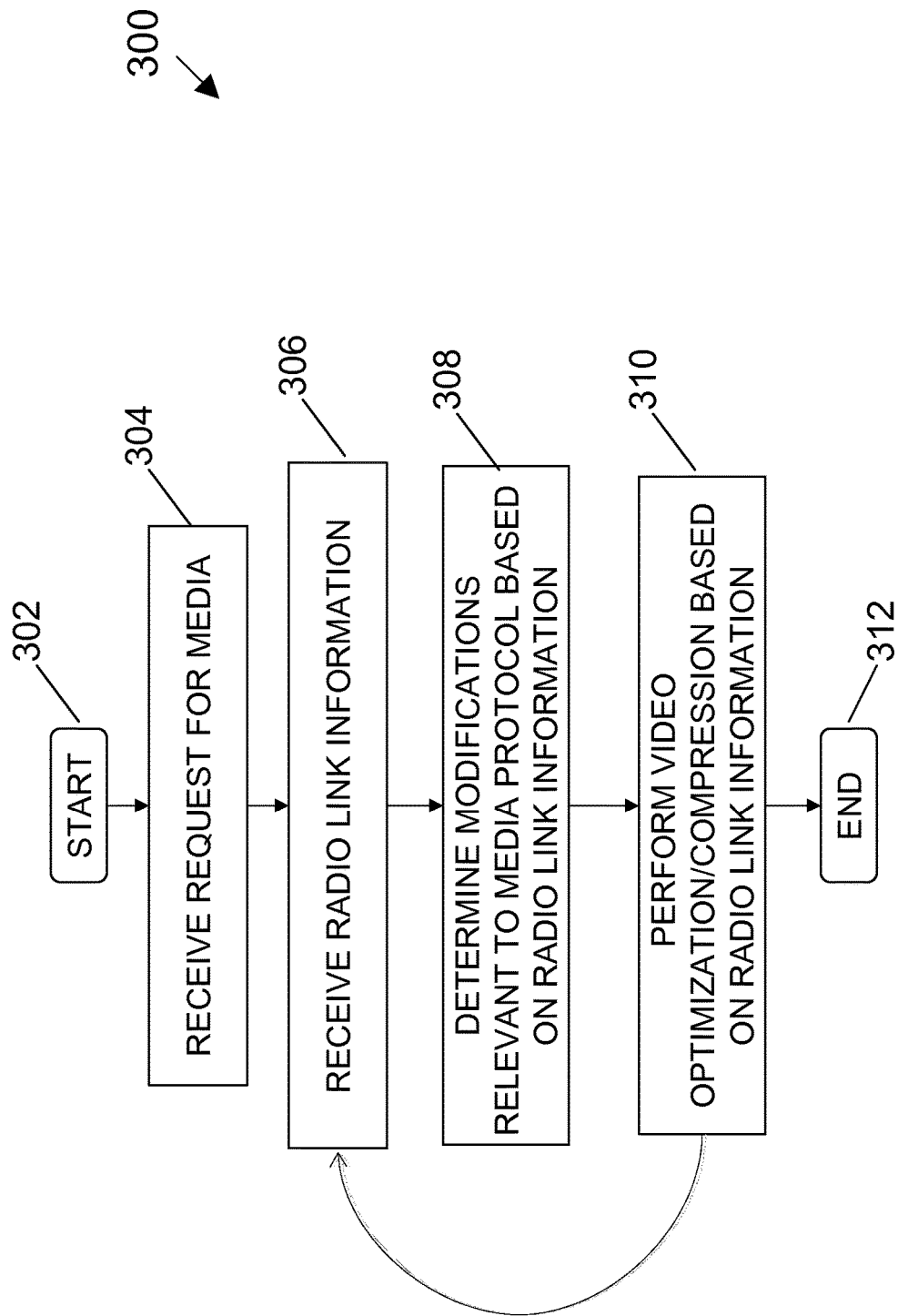
FIG. 3 illustrates a flow diagram of a method for media delivery enhancement in accordance with some embodiments.

The media delivery enhancement mechanism can be implemented as shown in FIG. 3. FIG. 3 illustrates a flow diagram of a method 300 for media delivery enhancement in accordance with some embodiments. FIG. 3 includes the following steps: step 304 of receiving a request for media, step 306 of receiving radio link information from an eNodeB, a nodeB, a radio access network or other network, step 308 of determining modifications relevant to the media protocol fragment request based on mobile system information, and step 310 of adjusting the media protocol fragment request by adding the modifications to the media protocol fragment request.

In step 306, radio link information is received from a nodeB. A persistent connection may be set up to receive continuous link information from the nodeB. This allows the method to adapt the quality of media continuously as the link information changes. In step 308, modifications may include turning off video transcoding or video optimization or video compression. At step 310, the modifications are performed. After modifications are performed, processing returns to step 306. This cycle may occur many times a second, in accordance with the frequency that information is received.

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iOS, RIM'S Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The method described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The media delivery enhancement gateway can be implemented as any combination of the following including an xGSN, an xGW, an xGW-SGW, and an xGW-PGW.

Figure 4:
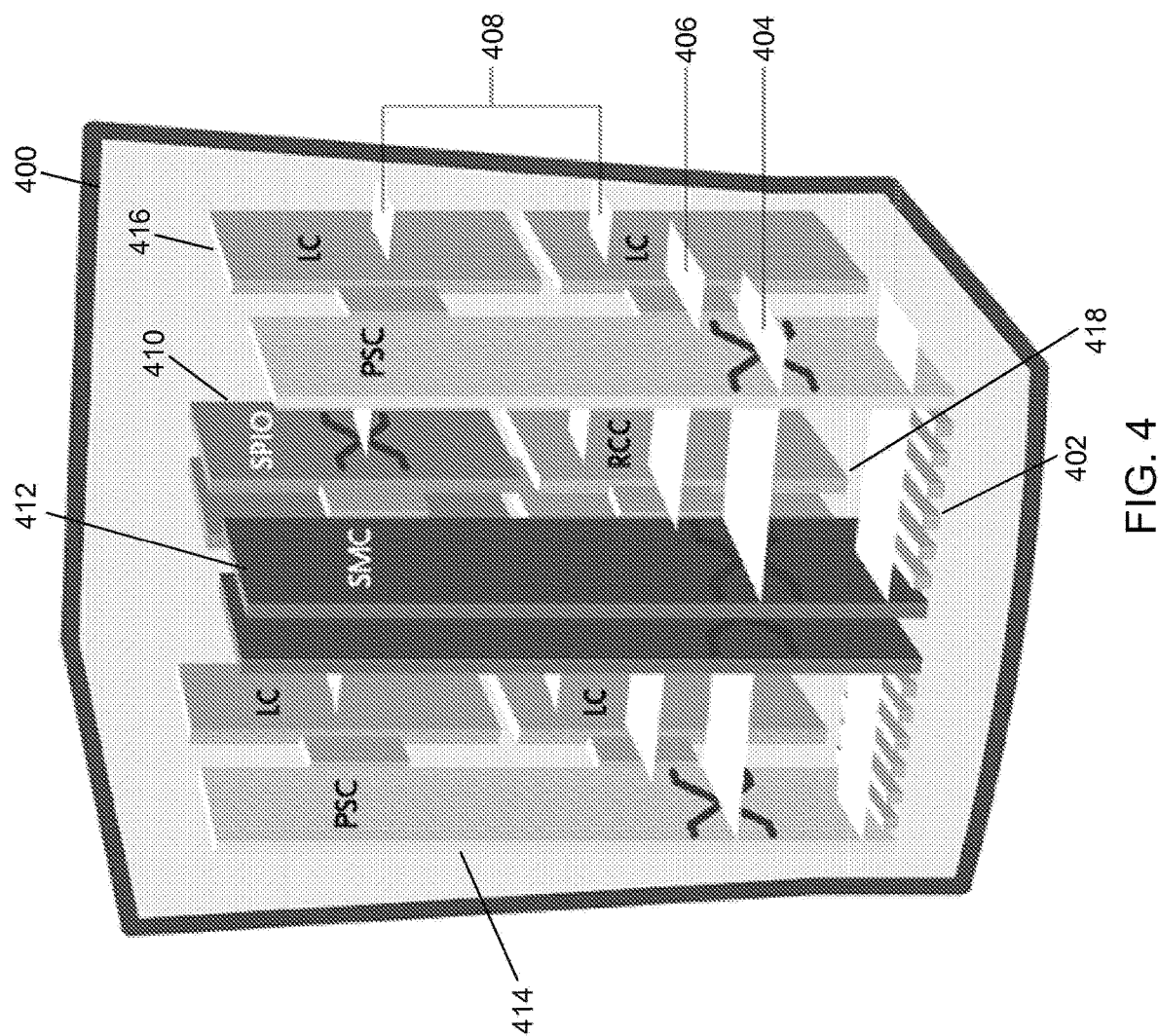
FIG. 4 illustrates a network device configuration for media delivery enhancement in accordance with some embodiments.

In some embodiments the network device can be implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 4 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system. In some embodiments, a redundancy crossbar card (RCC) can be used to make redundant connections between various cards in the network device. The RCC can include a crossbar switch for making connections as needed between cards in the network device and minimizes the wiring to connect any one card to any other card.

The operating system software can be based on a Linux software kernel and run specific applications in the network device such as monitoring tasks and providing protocol stacks. The software allows network device resources to be allocated separately for control and data paths. For example, certain packet accelerator cards (PAC) and packet services cards (PSC) can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A 10/All interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 5:
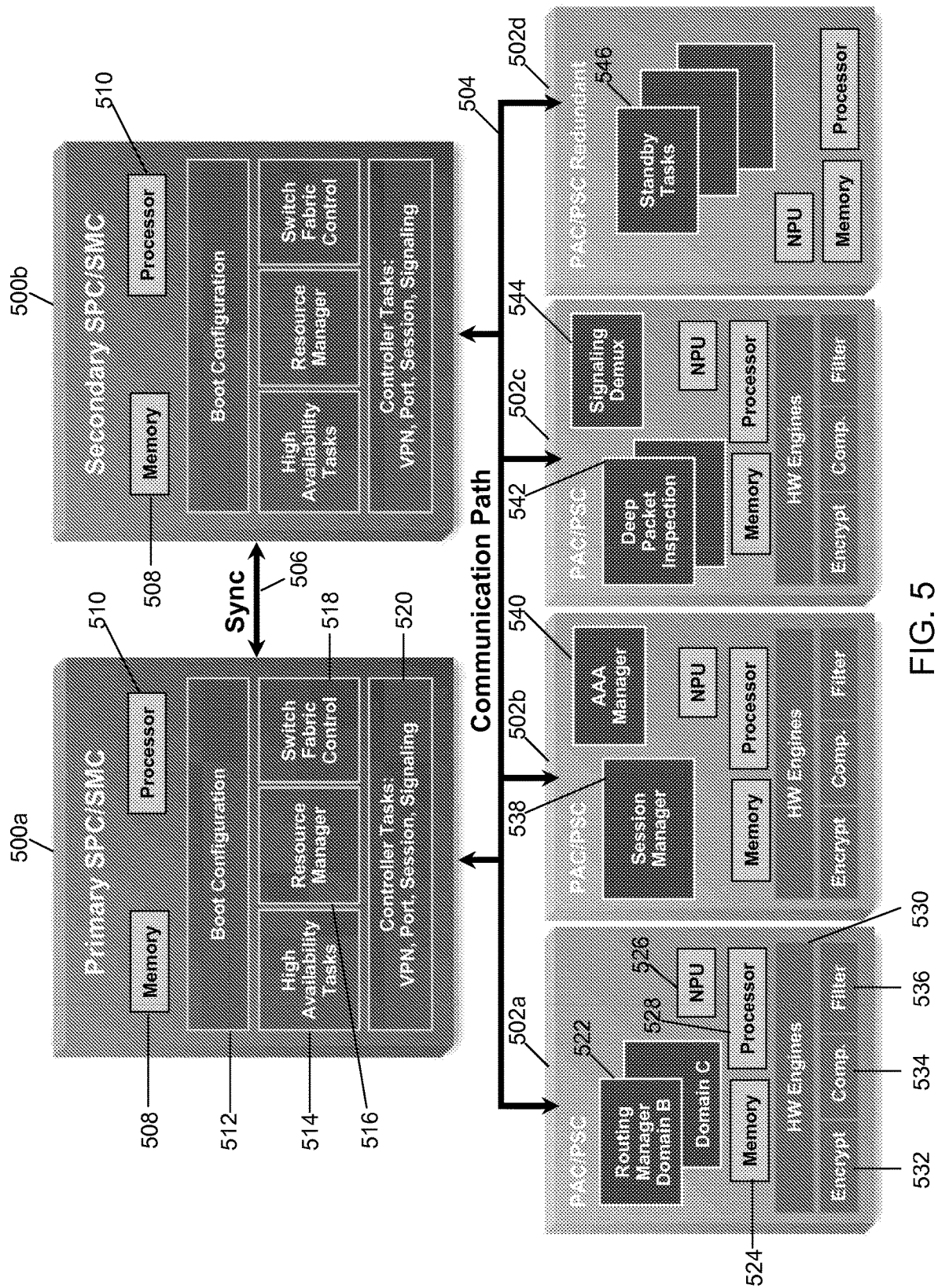
FIG. 5 illustrates an architecture of a network device configuration for media delivery enhancement in accordance with some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 5 illustrates a logical view of the software architecture of a network device in accordance with certain embodiments. As shown, the software and hardware can be distributed within the network device and across different circuit boards, processors, and memory. FIG. 5 includes a primary switch processor card (SPC)/system management card (SMC) 500*a*, a secondary SPC/SMC 500*b*, PAC/PSC 502*a*-502*d*, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502*a* provides routing managers 522 with each covering routing of a different domain. PAC/PSC 502*b* provides a session manager 538 and an AAA manager 540. The session manager 538 manages one or more sessions that correspond to one or more user equipment. A session allows a user equipment to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502*d* provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, a video compression server may be implemented using multiple video coprocessors.

We claim:

1. A computer-implemented method of video optimization, the computer-implemented method comprising:
   receiving streaming video data from a video server, wherein the streaming video data is destined for a mobile node;
   receiving radio frequency (RF) information from a baseband unit of a transceiver, wherein the baseband unit receives the RF information from a remote radio head of the transceiver, and wherein the RF information indicates a wireless power level of the mobile node and describes a radio link between the mobile node and the remote radio head;
   upon detecting, based on the RF information, a change in the wireless power level of the mobile node, modifying video compression of the streaming video data by modifying a video codec rate to match an effective channel data rate of the radio link;
   compressing, at a video optimization server, the streaming video data based on the modified video codec rate and policy information regarding the mobile node; and
   transmitting the compressed streaming video data to the mobile node through the baseband unit.

2. The computer-implemented method of claim 1,
   wherein the remote radio head includes an RF antenna and circuitry for transmitting the streaming video data over radio frequencies, and
   wherein the baseband unit performs baseband processing.

3. The computer-implemented method of claim 1, wherein the remote radio head and the baseband unit are elements of a cloud radio access network (RAN).

4. The computer-implemented method of claim 1, wherein the video optimization server is implemented on a gateway.

5. The computer-implemented method of claim 1, wherein the RF information is received in an out-of-band service orchestration protocol that is used to manage resources among devices in a network.

6. The computer-implemented method of claim 1, further comprising:
   communicating, with a policy server, an ability to enforce policies based on available resources and the RF information.

7. The computer-implemented method of claim 1, wherein the computer-implemented method is performed by the video optimization server, wherein the policy information is received at the video optimization server, and wherein the video optimization server is implemented on a gateway.

8. The computer-implemented method of claim 7, wherein the remote radio head and the baseband unit are elements of a cloud radio access network (RAN), wherein the remote radio head includes an RF antenna and circuitry for transmitting the streaming video data over radio frequencies, and wherein the baseband unit performs baseband processing.

9. The computer-implemented method of claim 8, wherein the RF information is received in an out-of-band service orchestration protocol that is used to manage resources among devices in a network, and wherein the computer-implemented method further comprises communicating, with a policy server, an ability to enforce policies based on available resources and the RF information.

10. A network device for video optimization, the network device comprising:
    one or more interfaces configured to:
        receive, from a video server, streaming video data that is destined for a mobile node; and
        receive radio frequency (RF) information from a baseband unit of a transceiver, wherein the baseband unit receives the RF information from a remote radio head of the transceiver, and wherein the RF information indicates a wireless power level of the mobile node and describes a radio link between the mobile node and the remote radio head; and
    a processor configured to:
        upon detecting, based on the RF information, a change in the wireless power level of the mobile node, modify video compression of the streaming video data by modifying a video codec rate to match an effective channel data rate of the radio link; and
        compress, at a video optimization server, the streaming video data based on the modified video codec rate and policy information regarding the mobile node;
    wherein the one or more interfaces are further configured to transmit the compressed streaming video data to the mobile node through the baseband unit.

11. The network device of claim 10,
    wherein the remote radio head includes an RF antenna and circuitry for transmitting the streaming video data over radio frequencies, and
    wherein the baseband unit performs baseband processing.

12. The network device of claim 10, wherein the remote radio head and the baseband unit are elements of a cloud radio access network (RAN).

13. The network device of claim 10, wherein the video server is implemented on a gateway.

14. The network device of claim 10, wherein the RF information is received in an out-of-band service orchestration protocol that is used to manage resources among devices in a network.

15. The network device of claim 10, wherein the processor is further configured to:
    communicate, with a policy server, an ability to enforce policies based on available resources and the received RF information.

16. A logic for video optimization and encoded on a non-transitory medium, wherein the logic when executed is configured to:
    receive, from a video server, streaming video data that is destined for a mobile node;
    receive radio frequency (RF) information from a baseband unit of a transceiver, wherein the baseband unit receives the RF information from a remote radio head of the transceiver, and wherein the RF information indicates a wireless power level of the mobile node and describes a radio link between the mobile node and the remote radio head;
    upon detecting, based on the RF information, a change in the wireless power level of the mobile node, modify video compression of the streaming video data by modifying a video codec rate to match an effective channel data rate of the radio link;
    compress, at a video optimization server, the streaming video data based on the modified video codec rate and policy information regarding the mobile node; and
    transmit the compressed streaming video data to the mobile node through the baseband unit.

17. The logic of claim 16, wherein the remote radio head and the baseband unit are elements of a cloud radio access network (RAN).

18. The logic of claim 16, wherein the logic is implemented on a gateway.

19. The logic of claim 16, wherein the RF information is received in an out-of-band service orchestration protocol that is used to manage resources among devices in a network.

20. The logic of claim 16, further configured to:
    communicate, with a policy server, an ability to enforce policies based on available resources and the RF information.

* * * * *